United States Patent [19]

Yoshimaru et al.

[11] Patent Number: 5,153,869
[45] Date of Patent: Oct. 6, 1992

[54] APPARATUS FOR RECORDING INFORMATION ON AN OPTICAL DISK WITH A MODIFIED CONSTANT LINEAR DENSITY SYSTEM

[75] Inventors: Tomohisa Yoshimaru, Yokohama; Tsuneshi Yokota, Kawasaki, both of Japan

[73] Assignee: Kabushiki Kaisha Toshiba, Kawasaki, Japan

[21] Appl. No.: 456,555

[22] Filed: Dec. 26, 1989

[30] Foreign Application Priority Data

Dec. 27, 1988 [JP] Japan .................... 63-327571
Jan. 6, 1989 [JP] Japan ........................ 64-456
Jan. 6, 1989 [JP] Japan ........................ 64-457

[51] Int. Cl.⁵ .......................................... G11B 7/00
[52] U.S. Cl. ................... 369/111; 369/275.4; 369/50; 369/48
[58] Field of Search .............. 369/111, 47, 48, 49, 369/50, 275.4

[56] References Cited

U.S. PATENT DOCUMENTS 4,532,621 7/1985 Nakagawa .................... 369/111
4,550,347 10/1985 Nakamuta .................... 369/111

OTHER PUBLICATIONS

U.S. application Ser. No. 456,962, filed Dec. 26, 1989.

*Primary Examiner*—Roy N. Envall, Jr.
*Assistant Examiner*—Nabil Hindi
*Attorney, Agent, or Firm*—Finnegan, Henderson, Farabow, Garrett and Dunner

[57] ABSTRACT

An information recording apparatus includes a rotating section for rotating an optical disk at a constant angular velocity, the disk including a spiral recording track or concentric recording tracks, a recording section for recording information with a light beam irradiated on the recording tracks of said optical disk, the light beam having an arbitrary recording frequency, and control means for controlling the recording section such that the information is recorded on the optical disk while a pitch between adjacent record pits is elongated as a position of a recording track is moved from an innermost track toward an outermost track, the pitch at the innermost track being a first pitch, the pitch at the outermost track being a second pitch, the pitch at a track between the innermost and outermost tracks being longer than the first pitch and shorter than the second pitch, and the second pitch being shorter than a third pitch expected at the outermost track when the optical disk is rotated at the constant angular velocity and the light beam is irradiated on the disk with a constant recording frequency.

6 Claims, 6 Drawing Sheets

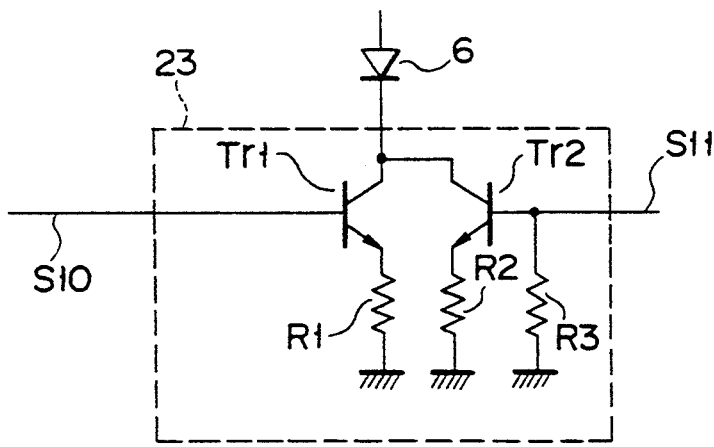
F I G. 2
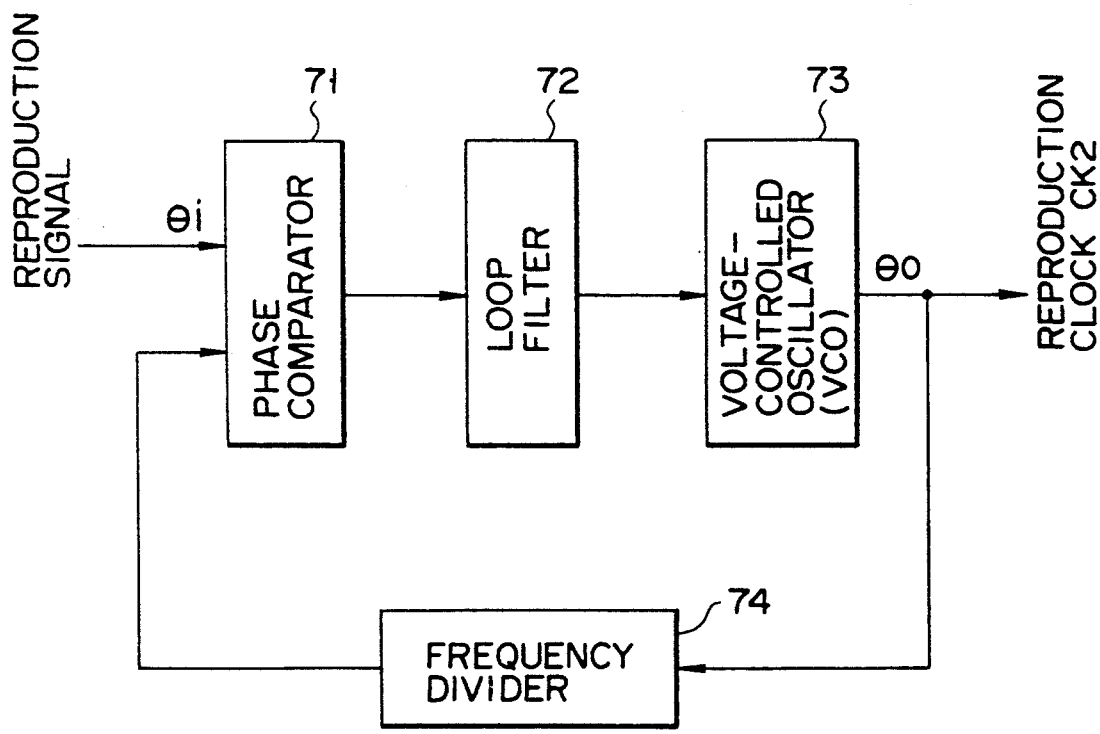
F I G. 3

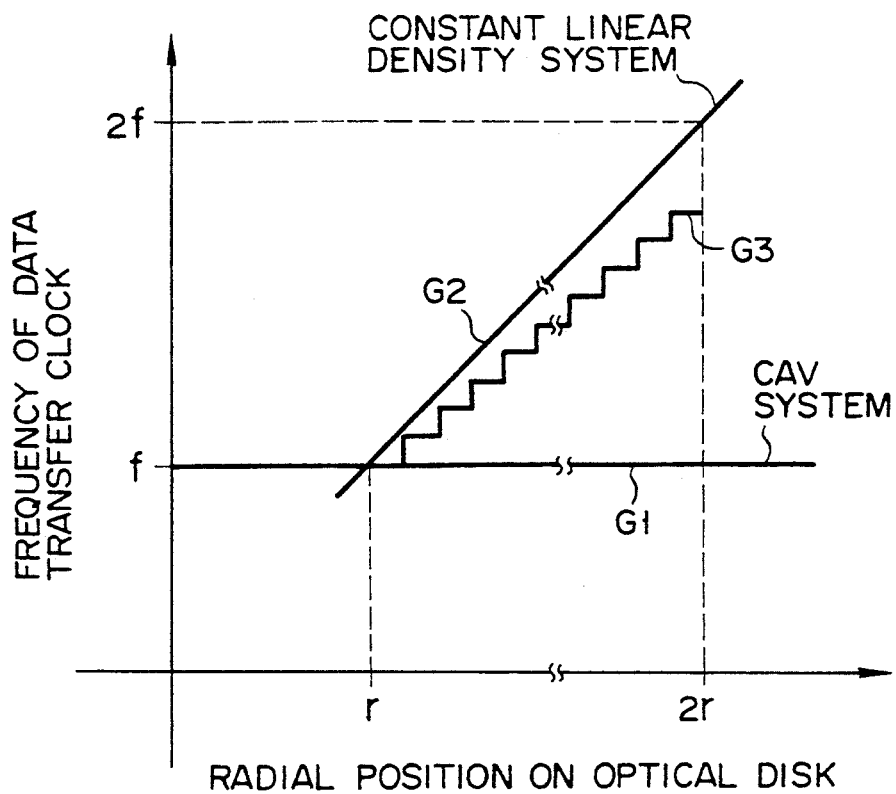
F I G. 6
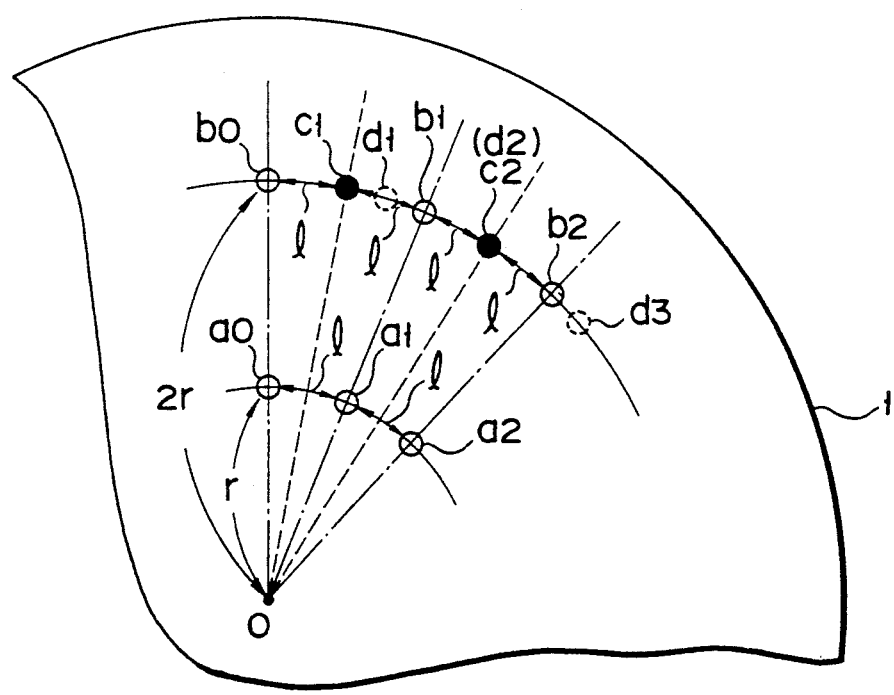
F I G. 7

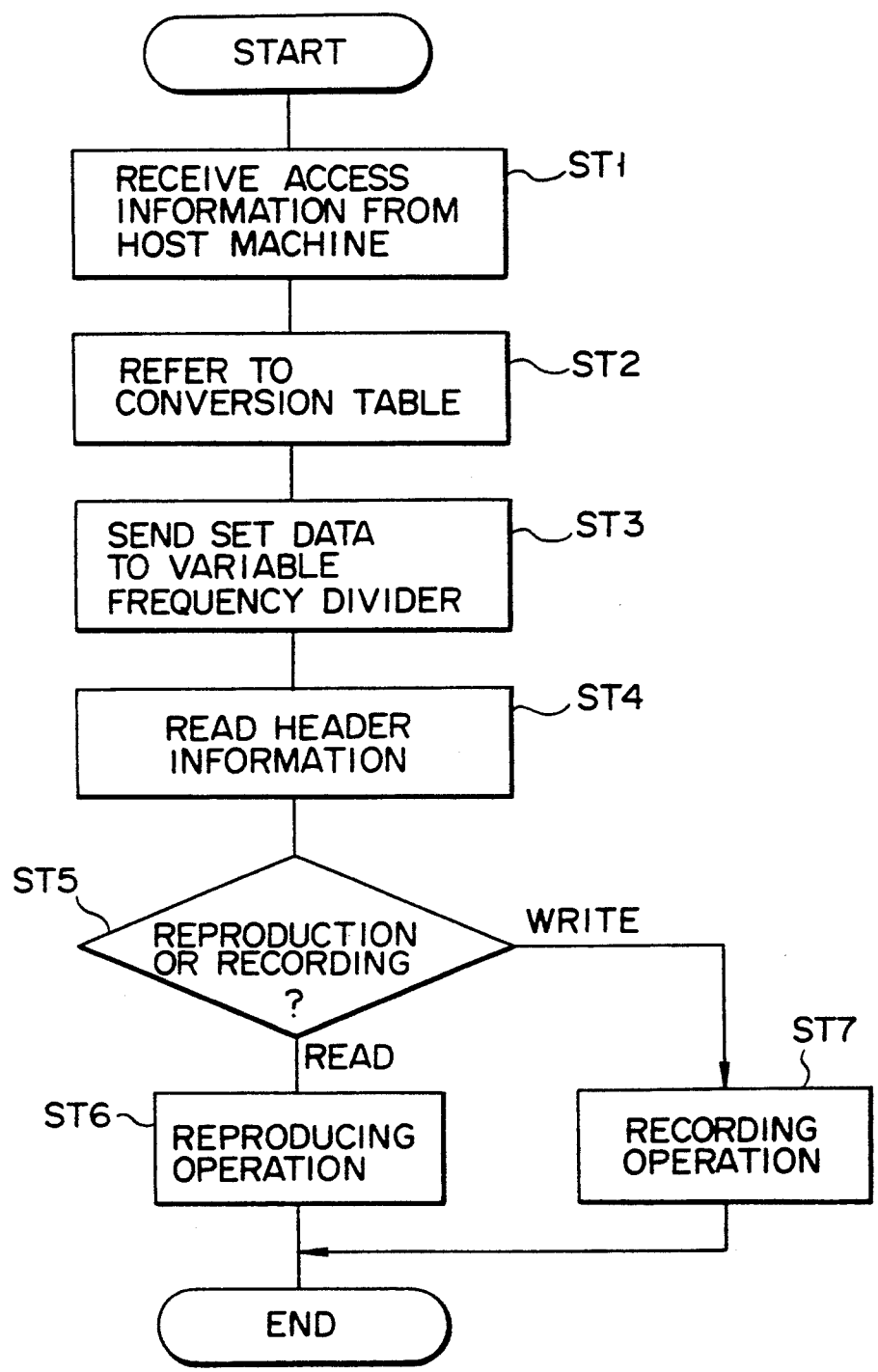
F I G. 9

APPARATUS FOR RECORDING INFORMATION ON AN OPTICAL DISK WITH A MODIFIED CONSTANT LINEAR DENSITY SYSTEM

BACKGROUND OF THE INVENTION

1. Field of the Invention

The present invention relates to an information recording apparatus for optically recording information, and, more particularly, to an information recording apparatus which can increase the recording capacity of a recording medium such as an optical disk and improve the reliability of recorded information.

2. Description of the Related Art

Recently, information recording/reproducing apparatuses, such as optical disk apparatuses, have been developed which record information on a recording medium such as a write once or erasable optical disk or reproduce information recorded on the recording medium. According to such information recording/reproducing apparatuses, an optical head which emits light is moved by a linear motor in the radial direction of an optical disk so as to face a recording or reproducing position on the disk. When the optical head reaches the target position, it emits light to record information on the optical disk or to reproduce information through photoelectric conversion of the reflected light from the optical disk.

A typical recording system for use in such optical disk apparatuses is the CAV (Constant Angular Velocity) system which keeps the number of rotations of the optical disk constant. This CAV system has merits of ensuring stable data recording and reproducing and shortening the required access time. According to this system, however, the number of clocks for data recording and reproducing or the frequency of data modulation and demodulation is constant irrespective of the location of target data on an optical disk, at the innermost track or at the outermost track. The CAV system therefore has a demerit of reducing the data recording density as the target position on the optical disk for data recording or reproducing approaches the outermost track.

There is another recording system for use in optical disk apparatuses, which uses the CLV (Constant Linear Velocity) system. This system provides a constant linear velocity and thus a constant recording density on an optical disk by reducing the number of rotations of the optical disk in accordance with movement of the position of an optical head on the optical disk from the inner track side toward the outer track side while keeping constant the number of clocks for data recording and reproducing or the frequency of data modulation and demodulation irrespective of the location of target data on an optical disk, at the innermost track or at the outermost track. This CLV system can increase the recording density on an optical disk and can therefore increase the recording capacity per optical disk. Due to the need to alter the number of rotations of an optical disk, the CLV system must wait for the rotational speed to reach the desired level. This undesirably results in a longer time for accessing to the target track for data recording or reproducing.

As a solution to the above shortcomings of the CAV and CLV systems, a constant linear density system has been developed which keeps the linear density on an optical disk constant. This system provides a constant recording density on an optical disk by changing the data transfer frequency at a recording/reproducing time in accordance with the position of an optical head on the optical disk while keeping the rotational speed of the disk constant. In other words, the constant linear density system provides a constant recording density by increasing the data transfer frequency in proportion to a change in position of the optical head on the optical disk or the recording position toward the outermost track.

The constant linear density system should increase the data transfer frequency in accordance with a change in the recording position toward the outermost track. Therefore, it should also satisfy severe data recording conditions on the outer tracks of an optical disk. In addition, due to the need to linearly increase the data transfer frequency in proportion to the recording position, the system needs additional hardware for controlling such a linear increase and its structure thus becomes more complex.

SUMMARY OF THE INVENTION

Accordingly, it is an object of this invention to provide an information recording apparatus which can ensure a greater recording capacity than the one attained by the CAV system and a sufficiently quicker access time than the one permitted by the CLV system, can execute stable data recording with looser recording conditions on the outer track on an optical disk than those required by the constant linear density system, needs less hardware for data recording and has a simple structure.

The present invention recording apparatus comprises a rotating section for rotating an optical disk at a constant angular velocity, the disk including a spiral recording track or concentric recording track, a recording section for recording information with a light beam irradiated on the recording tracks of said optical disk, the light beam having an arbitrary recording frequency, and a controller for controlling the recording section such that the information is recorded on the optical disk while a pitch between adjacent record pits is elongated as a position of a recording track is moved from an innermost track toward an outermost track, the pitch at the innermost track being a first pitch, the pitch at the innermost track being a second pitch, the pitch at a track between the innermost and outermost tracks being longer than the first pitch and shorter than the second pitch, and the second pitch being shorter than a third pitch expected at the outermost track when the optical disk is rotated at the constant angular velocity and the light beam is irradiated on the disk with a constant recording frequency.

According to the present invention, record pits are formed at the same predetermined pitch l as used in the prior art at an inner track side of the optical disk and record pits are formed while gradually increasing the pitch of the record pits within a range closer to the predetermined pitch than the middle of the predetermined pitch and the pitch of record pitches recorded by the CAV system as the radial position changes from an inner track side to an outer track side of the optical disk. The present invention can therefore increase the access time while maintaining a large recording capacity and suppress the recording conditions at an outer track portion of the optical disk.

BRIEF DESCRIPTION OF THE DRAWINGS

FIG. 2 is a circuit diagram illustrating an arrangement of a driver for use in the present information recording apparatus;

FIG. 3 is a block diagram showing a basic arrangement of a PLL (Phased-Locked Loop) controller;

FIG. 6 is a diagram explaining transfer timings;

FIG. 7 is a diagram explaining a record pit pitch;

FIG. 9 is a flowchart explaining the operation of the present information recording apparatus.

DETAILED DESCRIPTION OF THE PREFERRED EMBODIMENTS

Figure 1:
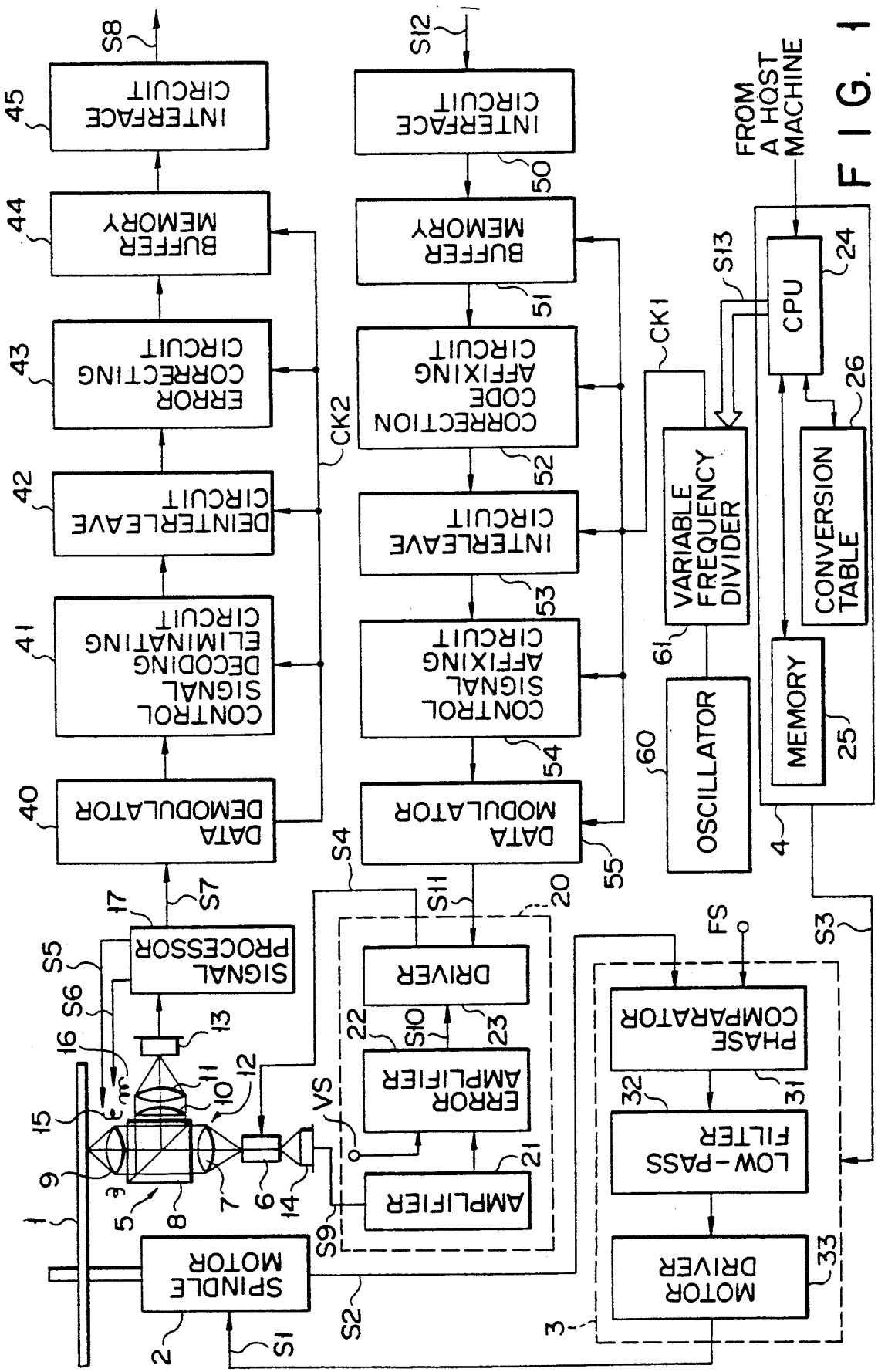
FIG. 1 is a block diagram illustrating the structure of an optical disk apparatus of one embodiment of an information recording apparatus according to the present invention.

An information recording apparatus embodying the present invention will be described below in detail with reference to the accompanying drawings. The schematic arrangement of an optical disk apparatus according to the present information recording apparatus will now be described referring to FIG. 1.

An optical disk 1 comprises a glass or plastic, disk-shaped substrate and a metal coating layer, which is coated on one surface of the substrate in a doughnut shape and is composed of tellurium, bismuth or the like. One or more recording tracks for recording information are formed on the optical disk 1 in a spiral or concentric manner.

The optical disk 1 is coupled to and rotated at a constant velocity by a spindle motor 2. The driving of this motor 2 to, for example, its rotation is controlled by a control signal S1 from a spindle motor controller 3.

The spindle motor controller 3 comprises a phase comparator 31 for comparing the phases of a reference frequency $F_S$ from a frequency oscillator (not shown) and a rotation pulse signal S2 from the spindle motor 2 which corresponds to the number of rotations of the motor 2, a low-pass filter 32 for eliminating a high-frequency component of the output signal of the phase comparator 31, and a motor driver 33 for amplifying the output signal of the low-pass filter 32 and supplying it to the spindle motor 2 to drive it. The spindle motor controller 3 outputs a control signal S1 for accurate synchronization with the reference frequency $F_S$ in accordance with a control signal S3 from a controller 4. This control signal S1 permits the spindle motor 2 to accurately rotate at a given number of rotations per unit of time.

The controller 4 comprises a central processing unit (CPU) 24 including a microcomputer, for example, a memory 25 including a RAM and a ROM, a conversion table 2 (to be described in detail later) including a ROM and other logic circuits. The controller 4 perform various controls (to be described later) in addition to controlling the rotation of the spindle motor 2.

An optical head 5 is disposed under the optical disk 1. This optical head 5 accesses the optical disk 1 for data recording and reproducing, and comprises a semiconductor laser oscillator 6, a collimator lens 7, a beam splitter 8, an objective lens 9, a well-known astigmatism optical system 12, which includes a cylindrical lens 10 and a convex lens 11, and a photosensor 13. A photosensor 14 is disposed at the proximity of the semiconductor laser oscillator 6 of the optical head 5. This optical head 5 is moved in the radial direction of the optical disk 1 by a moving mechanism (not shown) including a linear motor, for example. The optical head 5 is moved to a target track for data recording or reproducing by the moving mechanism which is driven by a control signal from the controller 4.

The semiconductor laser oscillator 6 generates a divergent laser beam in accordance with a drive signal S4 from laser controller 20. In recording information on the optical disk 1, the oscillator 6 generates a high-intensity laser beam whose intensity is modulated in accordance with information to be written. In reading information from the optical disk 1 for data reproduction, the oscillator 6 generates a laser beam with a constant low intensity.

The divergent laser beam from the semiconductor laser oscillator 6 is converted into parallel beams by the collimator lens 7, and the resultant beams are led to the beam splitter 8. After passing the beam splitter 8, the laser beams enter the objective lens 9 which in turn converges the beams onto the recording film of the optical disk 1.

The objective lens 9 is suspended in such a way that it is movable in the direction of its optical axis by a lens actuator 15 serving as a lens driving mechanism. When a focus servo signal S5 is supplied to the lens actuator 15 from a focus servo circuit (not shown) provided in a signal processor 17, the objective lens 9 is moved in the optical axial direction. At this time, a signal corresponding to the intensity of the laser beam converged on the surface of the optical disk 1 through the objective lens is fed back to the signal processor 17 to thereby form a focus servo loop, thus focusing the objective lens 9. When a minimum beam spot is formed on the surface of the recording film of the optical disk 1 the objective lens 9 is set at the focused state.

The objective lens 9 is also suspended in such a way that it is movable in the direction normal to the optical axis by a lens actuator 16. When a tracking servo signal S6 is supplied to the lens actuator 16 from a tracking servo circuit (not shown) provided in the signal processor 17, the objective lens 9 is moved in the direction normal to the optical axis. At this time, a signal corresponding to the intensity of the laser beam irradiated on tracks the surface of the optical disk 1 through the objective lens 9 is fed back to the signal processor 17 to thereby form a tracking servo loop, thus placing the objective lens 9 in an ON track state. When the reflected light from a track on the optical disk becomes a predetermined balanced state, the objective lens 9 enters the ON track state. In the focused state and the ON track state, information can be written on or read out from the optical disk 1.

In the focused state, the divergent laser beam reflected from the optical disk 1 is converted into parallel beams by the objective lens 9, which are then returned to the beam splitter 8. The beams passing through the beam splitter 8 are led onto the photosensor 13 by the astigmatism optical system 12. This photosensor 13 detects a focus error by detecting a change in shape of a laser beam and detects a tracking error by detecting deviation of the laser beam from its proper beam converging position.

The photosensor 13 is includes four photosensing cells (not shown), which convert a laser beam led thereon by the astigmatism optical system 12 into an electrical signal. Signals output from these four photosensing cells are sent to the signal processor 17, which in turn causes the focus servo circuit (not shown) to generate the focus servo signal S5 based on the received signals. This focus servo signal S5 is supplied to the actuator 15 to thereby form the focus servo loop. Further, upon reception of the output signals from the photosensing cells, the tracking servo circuit (not shown) in the signal processor 17 produces the tracking servo signal S6. This signal S6 is supplied to the actuator 16 to thereby form the tracking servo loop. A reproduction signal S7 output from the signal processor 17 represents information recorded on the optical disk 1, and is sent to a data demodulator 40.

The data demodulator 40 serves to demodulate the reproduction signal S7 from the signal processor 17. The demodulated signal from the data demodulator 40 is supplied to a control signal decoding/eliminating circuit 41.

This circuit 41 serves to detect and remove a control signal such as a sync code, affixed at the time of data recording, from the demodulated signal from the data demodulator 40. Data having the control signal removed by the circuit 41 is supplied to a deinterleave circuit 42.

The deinterleave circuit 42 serves to restore data interleaved at the time of data recording to the original data. Interleaving is a data recording method which divides sequential data to be recorded on the optical disk 1 into predetermined units and rearranges those units to be non-sequential before recording them. This method improves the performance by, for example, correcting a burst error when such occurs. A signal deinterleaved by the deinterleave circuit 42 is supplied to an error correcting circuit 43.

The error correcting circuit 43 detects and corrects a 1-bit error or an error consisting of two or more bits, which is included in the deinterleaved data. The error-corrected data from the circuit 43 is supplied to a buffer memory 44. When the circuit 43 detects no error in the deinterleaved data, this data is, of course, supplied as it is to the buffer memory 44.

The buffer memory 44 temporarily stores error-free data from the error correcting circuit 43. The data temporarily stored in the buffer memory 44 is supplied to an interface circuit 45 at a given timing.

The interface circuit 45 serves to control data exchange with a host machine (not shown) acting as an external unit, for example. In other words, data reproduced from the optical disk 1 is sent as a reproduction signal S8 via the interface circuit 45 to the external unit.

The photosensor 14, including a photoelectric converting element such as a photodiode, is provided on the side opposite that of the semiconductor laser oscillator 6 from which the recording or reproducing laser beam is emitted. The photosensor 14 serves to perform photoelectric conversion of a monitor beam from the opposite light emitting port. That is, upon reception of a monitor beam from the oscillator 6, the photosensor 14 converts the beam into an electric signal (optical current) and then sends it as an optical output monitor signal S9 of the oscillator 6 to an optical output controller 20.

The controller 20 maintains the optical output of the semiconductor laser oscillator 6 constant. In other words, the controller 20 receives the optical output monitor signal S9 from the oscillator 6 to thereby execute a feedback control operation in order to keep the optical output of the oscillator 6 constant. Controller 20 comprises an amplifier 21, an error amplifier 22 and a driver 23.

The amplifier 21 converts the monitor signal S9, output as an optical current by the photosensor 14, into a voltage signal then amplifies the signal. The output of this amplifier 21 is a voltage signal corresponding to the intensity of light received by the photosensor 14 or the optical output from the semiconductor laser oscillator 6. The output of the amplifier 21 is supplied to the error amplifier 22.

The error amplifier 22 amplifies the difference between the output signal of the amplifier 21 and a reference voltage $V_S$. More specifically, the error amplifier 22 compares the output voltage of the amplifier 21 as one input with the reference voltage $V_S$ produced from a constant voltage source (not shown) as the other input, amplifies the difference between these two inputs and outputs the resultant signal. The output of the error amplifier 22 is supplied as an error signal S10 to the driver 23. The driver 23 drives the semiconductor laser oscillator 6, thus forming a feedback loop. In other words, the optical output controller 20 uses feedback control to control the output signal of the amplifier 21 to permit it to approach the reference voltage $V_S$, so that a constant optical output is provided from the oscillator 6. The reference voltage $V_S$ is a constant voltage for allowing the oscillator 6 to emit a laser beam with a given level necessary for data reproduction.

The driver 23, which drives the semiconductor laser oscillator 6 as mentioned above, comprises two transistors Tr1 and Tr2 and resistors R1 to R3 as shown in FIG. 2. The transistor Tr1 has its base supplied with the error signal S10 from the error amplifier 22. The transistor Tr1 further has its collector coupled to the oscillator 6 and emitter grounded via the resistor R1. The transistor Tr2 has its base supplied with a record pulse signal S11 corresponding to data to be recorded, this signal S11 being output from a data modulator 55 to be described later. The base of this transistor Tr2 is grounded via the resistor R3. The transistor Tr2 further has its collector coupled to the oscillator 6 and emitter grounded via the resistor R2. With the above arrangement, the error signal S10 is supplied to the base of the transistor Tr1 at the time of data reproduction. This permits a drive current to flow S through the collector of the transistor Tr1, and the semiconductor laser oscillator 6 emits sequential laser beams with a low intensity. At the time of data reproduction, the transistor Tr2 is turned off. That is, the oscillator 6 is driven only by the transistor Tr1. At the time of data recording, the base of the transistor Tr1 is supplied with that voltage signal which is obtained by causing a sample and hold circuit (not shown) to hold the voltage supplied at the time of the immediately previous data reproduction. As a result, the same drive current as attained at the time of data reproduction flows through the collector of the transistor Tr1. Meanwhile, a drive current variable according to record data flows through the collector of the transistor Tr2. Accordingly, the semiconductor laser oscillator 6 is driven by a signal having those signals flowing through the transistors Tr1 and Tr2 superimposed one upon another and intermittently emits high-intensity laser beams in accordance with the record data.

The interface circuit 50 serves to control data exchange with a host machine (not shown) acting as an external unit, for example. In other words, record data S12 supplied from the external unit is sent via the interface circuit 50 to a buffer memory 51.

The buffer memory 51 temporarily stores the record data S12 sent through the interface circuit 50, and the data in this memory 51 is supplied to a correction code affixing circuit 52 at a given timing.

The circuit 52 serves to detect a 1-bit error or an error consisting of two or more bits and affix a redundant code for permitting correction of the error. The record data having the correction code added by the circuit 52 is supplied to an interleave circuit 53.

The interleave circuit 53 serves to improve the performance of correcting a burst error when such occurs. In other words, the interleave circuit 53 rearranges sequential data in order to record it in a dispersed manner on the optical disk 1. With this interleaving being executed for data recording, even if part of data is sequentially destroyed due to, for example, damaging of the optical disk, the destroyed sequential data can be dispersed by performing the aforementioned deinterleaving operation at the time of data reproduction. This reduces the number of errors included in a predetermined unit of data and increases the possibility of correcting the data by the added correction code. The record data interleaved by the interleave circuit 53 is supplied to a control signal affixing circuit 54.

Control signal affixing circuit 54 affixes a control signal such as a sync code to the record data interleaved by the interleave circuit 53. The record data having such a control signal affixed thereto is supplied to a data modulator 55.

The data modulator 55 performs a digital modulation so that the record data becomes a signal suitable for data recording. The data modulator 55 includes a ROM (not shown) in which predetermined data is stored in advance. The data modulator 55 refers to the ROM in accordance with input record data to execute the digital modulation. The modulated record data is output as the serial record pulse signal S1 through a register (not shown). The pulse signal S11 is supplied to the base of the transistor Tr2 of the driver 23, and drives the semiconductor laser oscillator 6 as described above. As a result, the oscillator 6 intermittently emits a high-intensity laser beam according to the record data to record information on the optical disk 1.

The aforementioned buffer memory 51, correction code affixing circuit 52, interleave circuit 53, control signal affixing circuit 54 and data modulator 55 operate in synchronism with a transfer clock CK1, which is supplied from a variable frequency divider 61.

The oscillator 60 generates the most primitive clock signal which alternates at given cycles, and this clock signal is supplied to the variable frequency divider 61.

The variable frequency divider 61 divides a clock signal of a given frequency from the oscillator 60 and outputs the resultant signal as the transfer clock CK1. The frequency dividing ratio in the divider 61 is dynamically determined on the basis of set data S13 output from the controller 4. The set data S13 is stored in the conversion table 26 including in a ROM in the controller 4. The conversion table 26 receives a track number which is one piece of header data of the optical disk 1 and outputs the set data S13 according to this track number. As illustrated in FIG. 6, for example, the conversion table 26 holds the set data S13 which provides such a characteristic line G3 as to increase step by step the frequency of the data transfer clock CK1 as the track number is increased.

A characteristic line G1 in FIG. 6 represents the characteristic of the data transfer clock in the CAV system in which data is recorded with a constant frequency f irrespective of the radial directional position r-2r on the optical disk 1. As shown in FIG. 7, therefore, record pits are formed in the order of a0, a1, a2, ... on the track with a radius r, and in the order of b0, b1, b2, ... on the track with a radius 2r. In this case, since the number of rotations of the optical disk 1 or the angular velocity is constant, the record pit pitch on the track with a radius 2r is 2l where l is the record pit pitch on the track with a radius r.

A characteristic line G2 represents the characteristic of the data transfer clock in the constant linear density system. The frequency of this data transfer clock linearly increases in proportion to a position change in the radial direction toward the outer track on the optical disk 1, i.e., in proportion to an increase in the track number. More specifically, the data transfer clock has a frequency f at the position of the radius r on the optical disk 1, while it has a frequency 2f, twice higher than the former one, at the position of the radius 2r. Therefore, record pits are formed in the order of a0, a1, a2, ... as per the CAV system on the track with a radius r, but they are formed in the order of b0, c1, b1, c2, b2, ... on the track with a radius 2r. In this case, since, with the record pit pitch on the track with a radius r being l, the frequency of the data transfer clock for a radius 2r is 2f, the record pit pitch on the track with the radius 2r also becomes l, thus ensuring a constant recording density irrespective of the track.

The characteristic line G3 represents the characteristic of the data transfer clock CK1 involved in the present invention. The frequency of this clock CK1 is set to become higher in proportion to a change in the radial directional position on the optical disk 1 toward the outer tracks. The characteristic line G3 has a gentler inclination that the characteristic line G2 for the constant linear density system and changes in step. As shown in FIG. 7, therefore, record pits are formed in the order of a0, a1, a2, ... on the track with a radius r as per the CAV system, and has a record pit pitch l. On the track with a radius 2r, however, record pits are formed in the order of b0, d1, c2 (d2), d3, ... with the record pit pitch being between those of the characteristic lines G1 (CAV system) and G2 (constant linear density system); that is, l < record pit pitch < 2l.

According to this recording system, therefore, while the recording capacity on the track with a radius 2r is set substantially greater than that on the track with a radius r, the linear density on the latter track is controlled to be substantially smaller than that on the former track. Accordingly, the data recording capacity can be relatively increased and data recording at an outer track portion on the optical disk 1 can be stably carried out.

The data transfer clock CK1 in this recording system is changed in step, not linearly in accordance with the radial position on the optical disk 1 as in the constant linear density system. The employment of this method can facilitate designing of the variable frequency divider 61 and reduce the amount of hardware necessary to constitute the divider 61.

A description will now be given of a clock used for data reproduction. A signal reproduced from the optical disk 1 is asynchronous with the data transfer clock CK1. A reproduction clock CK2, which is supplied to the data demodulator 40, control signal decoding-/eliminating circuit 41, deinterleave circuit 42, error correcting circuit 43 and buffer memory 44, is produced by separating a clock from a self clock included in the reproduced digital modulated signal. The separation of the clock is executed by a clock separator included in the data demodulator 40. This clock separator includes a PLL controller.

As shown in FIG. 3, the PLL controller comprises a phase comparator 71, a loop filter 72, a voltage-controlled oscillator (VCO) 73 and a frequency divider 74, as shown in FIG. 3. These elements, when connected as illustrated in FIG. 3, form a feedback loop.

Figure 4:
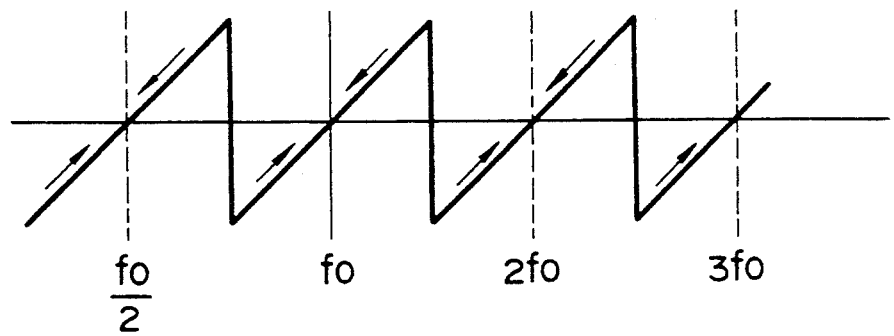
FIG. 4 is a waveform diagram for explaining the operation of the PLL controller.

Generally, binary data of a signal reproduced from the optical disk 1 has undergone digital modulation. To separate a self clock signa included in this digital modulation signal, the binary data is input as a reproduction signal to the phase comparator 71. Only upon reception of an input pulse, the phase comparator 71 compares the phase $\theta i$ of the input with the phase $\theta o$ of the output. FIG. 4 illustrates the phase comparison characteristic.

Figure 5:
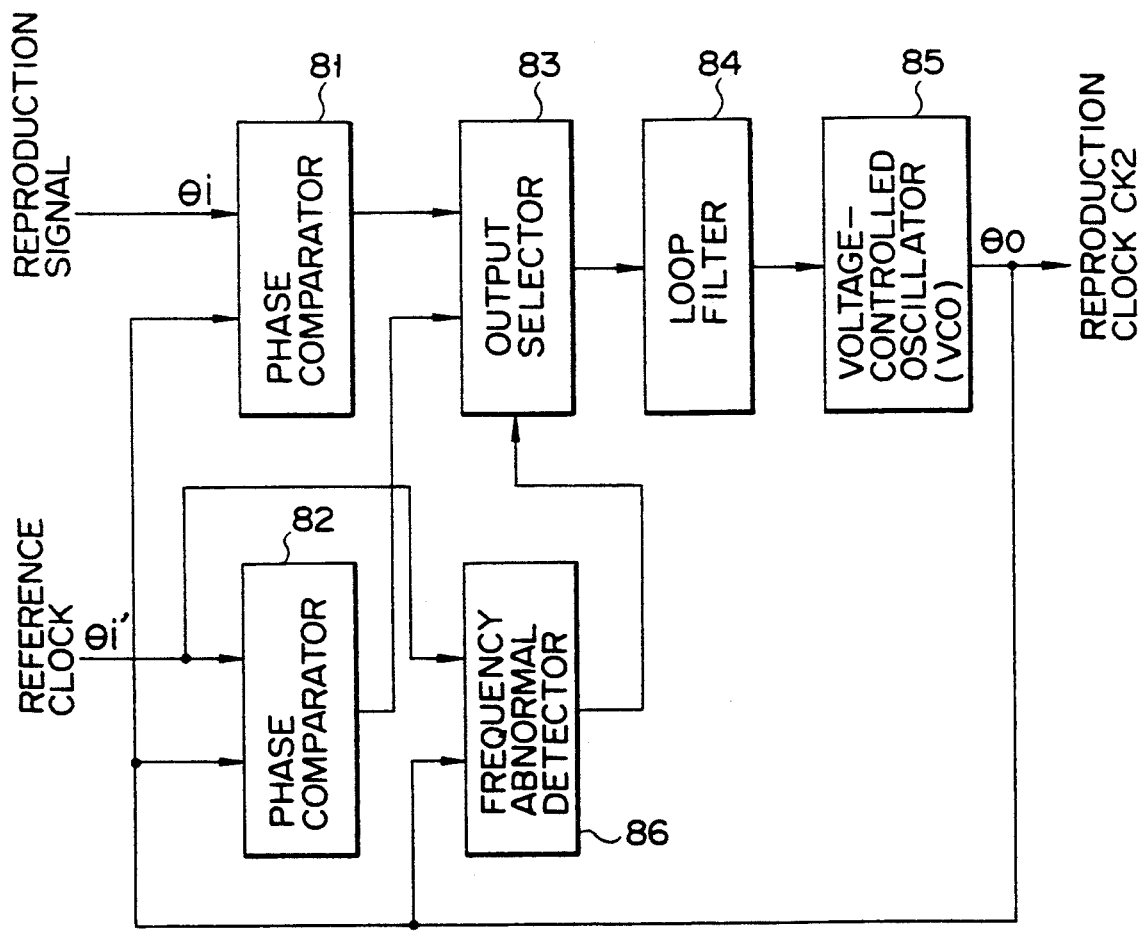
FIG. 5 is a block diagram showing an arrangement of a PLL controller serving as a clock separator used in the present information recording apparatus.

Since the phase $\theta i$ of the input is compared with the phase $\theta o$ of the output only at the edge of the input pulse, there exist a plurality of frequencies which cause phase locking as shown in FIG. 4. To avoid such a circumstance, a frequency abnormal detector 86 is used to permit accurate clock separation from the digital modulation signal obtained at the time of data reproduction. That is, as shown in FIG. 5, the actual PLL controller comprises phase comparators 81 and 82, an output selector 83, a loop filter 84, a voltage-controlled oscillator 85 and the frequency abnormal detector 86. These elements, when connected as illustrated in this diagram, form a feedback loop.

Referring to FIG. 5, in accessing an address (track number) portion with different radial positions, first the reference clock of a frequency $\theta i'$ according to the address is input to invoke the phase loop and is compared with the frequency $f_0$. Then, at the time of accessing the above address, the signal to be supplied to the loop filter 84 is switched to the output of the phase comparator 81 from the output of the phase comparator 82 by the output selector 83 to thereby execute the phase locking. This permits accurate clock separation so that header information such as a track number can be decoded.

Since data recording is carried out while the data transfer clock CK1 is changed step by step, the frequency of the reproduction clock CK2 differs at those track portions where the transfer clock CK1 is changed. If the frequency difference in one step is large, therefore, the accurate phase locking cannot be executed when accessing to other tracks than the one which belongs to the frequency of a predetermined transfer clock. This means that the header information cannot be decoded. In this respect, if the frequency difference in one step is set lower than a data decoding limit in a case where digital-modulated data is decoded using the frequency of the an adjacent transfer clock, the header information can be accurately decoded even if the adjacent transfer clock region different from the target region is accessed. It is therefore possible to access the target address again.

As an example, the data decoding limit for 2-7 code modulation which is one of digital modulation systems is ±6.25%. Therefore, no problems would occur if the condition for detection a frequency abnormality is equal to or less than 6% and a change in one step of the data transfer clock CK1 is set smaller than that value.

It should be understood that about 1% or 100 steps as a whole are sufficient for a change in data transfer clock CK1 per step. This facilitates designation of the transfer clock and can prevent the otherwise possible problem that the phase locking cannot be done when accessing the adjacent tracks.

A description will now be given of the relation between the radial directional position on the optical disk 1 and the recording density (record pit pitch). In heat mode recording, where record pits are formed by the heat energy of a focused laser beam, the recording condition is determined by the energy J and the sensitivity of the optical disk 1 if the energy density of a focused beam spot is constant, irrespective of the radial directional position on the optical disk 1. The energy J is a product of the optical output P of the laser (W: watts) and record pulse width $T_P$ (s: seconds) and is expressed by the following equation.

$$\text{Energy } J = P \times T_P \ldots \quad (1)$$

Under this recording condition and also under a condition where the laser emitting performance of the semiconductor laser oscillator 6 is limited, the optical disk apparatus should perform data recording at the highest speed possible.

Given that the recording region of the optical disk 1 ranges from the area of a radius r (hereinafter referred to as inner track) to the area of a radius 2r (hereinafter referred to as outer track), the linear velocity at the outer track is twice the linear velocity at the inner track if the number of rotations of the disk is constant. To obtain the same recording condition at the inner track and the outer track, the recording energy J at these tracks should be set the same. To eliminate the influence of the linear velocity, however, it is desirable that with the energy $J_1$ at the inner track being given by $$J_1 = P_1 \times TP_1 \ldots \quad (2),$$

the energy $J_2$ at the outer track should be given by:
$$J_2 = (2 \cdot P_1) \times (T_{P_1}/2) = J_1 \ldots \quad (3)$$

In other words, the laser beam emitting time for data recording at the outer track becomes the same as the one needed at the inner track by doubling the laser beam output $P_1$ of the semiconductor laser oscillator 6 and reducing the record pulse width $T_{P_1}$ to a half at the outer track. As a result, record pits with a constant shape can be formed irrespective of whether the target is at the inner track or outer track. Due to the limitation of the light emitting performance of the semiconductor laser oscillator 6, however, it is actually difficult to double the laser beam output $P_1$. This circumstance should therefore present a very severe recording condition for the constant linear density system in which the optical disk rotates at a constant velocity.

Figure 8:
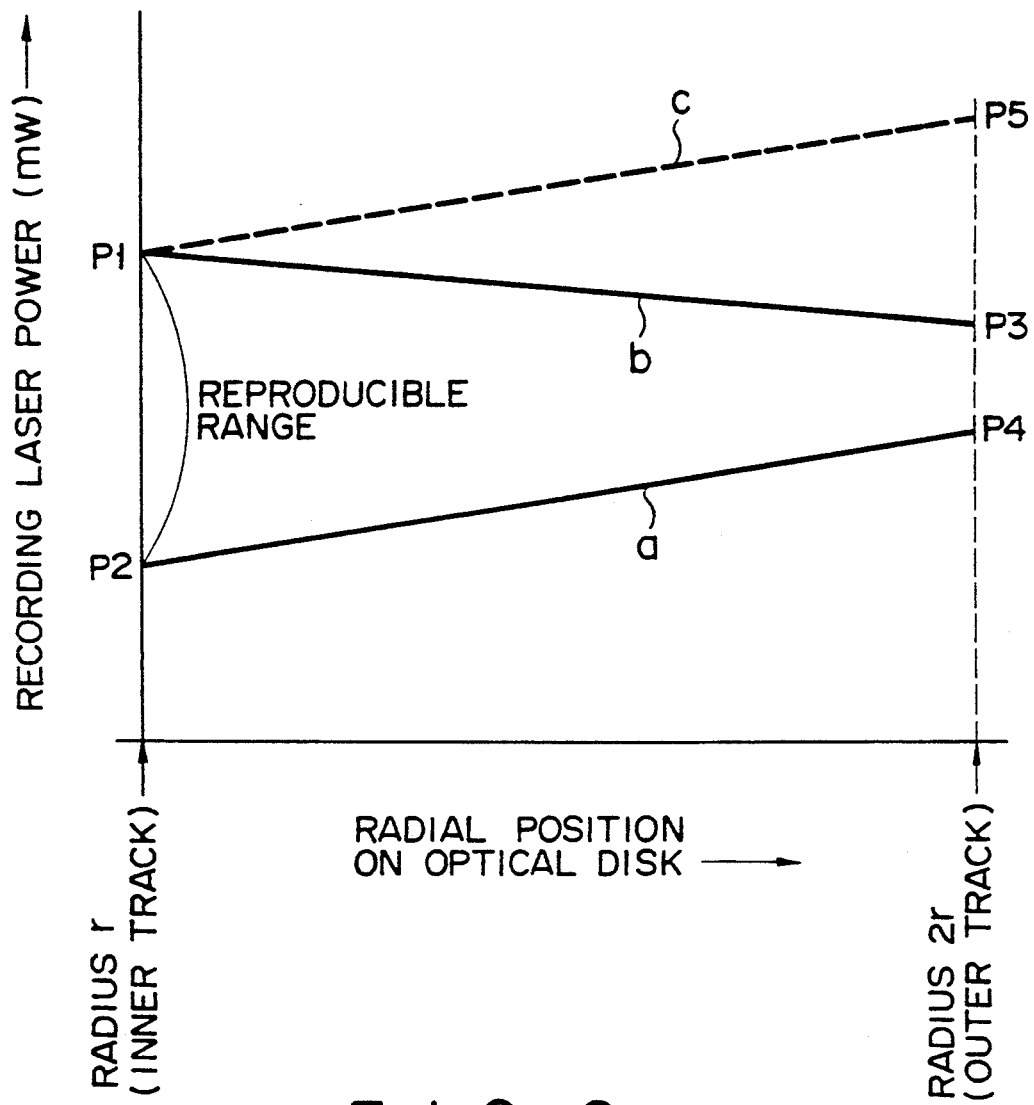
FIG. 8 is a diagram explaining a recording laser power margin.

FIG. 8 illustrates the characteristic of the margin of the recording laser power in the constant linear density recording system which was measured with the record pulse width $T_P$ being constant irrespective of the radial directional position on the optical disk 1. In measuring the power, the following procedure was performed. First, a record pulse width $T_P$ and optimization of the record pit pitch at the innermost track (position with a radius r) were determined. Then recording was actually carried out while changing the recording laser power and the recorded portion was reproduced. Measurement determined that the lower limit of the recording laser power in a reproducible range is $P_2$ and the upper limit is $P_1$.

As indicated by the solid line a in FIG. 8, the lower limit of the recording laser power is $P_2$ at the innermost track of a radius r and $P_4$ at the outermost track of a radius 2r and $P_4 > P_2$. This is because the linear velocity at the outer track is twice as great which requires much recording laser power for data recording.

As indicated by the solid line b in FIG. 8, the upper limit of the recording laser power is $P_1$ at the innermost track of the radius r and $P_3$ at the outermost track of the radius 2r and $P_3 < P_1$. This is because with a constant record pulse width $T_P$, the greater the recording laser power becomes, the larger the record pits formed become at the outer track portion. In this respect, the recording laser power margin is small. It is desirable that this margin be as wide as possible in view of longer stability and reliability of the optical disk apparatus and also be constant irrespective of the recording position on the optical disk 1.

In order to provide the upper limit of the recording laser power as indicated by the dotted line c in FIG. 8, for example, and the recording laser power margin to satisfy "$P_1 - P_2 = P_5 - P_4$", data recording is carried out with the record pit pitch being gradually set wider as the position on the optical disk 1 moves toward the outer track according to the present invention. In other words, since the relative linear velocity between the optical head 5 and the optical disk 1 increases in accordance with movement of the optical head 5 from the inner track side toward the outer track side on the optical disk 1, data recording is executed while gradually increasing the interval between record pits by increasing the frequency of the transfer clock with that movement by a given rate lower than the constant linear density system which keeps the pitch of the record pits constant.

The results of the experiments conducted by the present inventors show that the upper limit characteristic of the recording laser power as indicated by the dotted line c can be obtained by recording data with the record pit pitch at the outermost track of the radius 2r being increased by about 10 % to realize the same recording laser power margin for the inner track side, as compared with the one used in the constant linear density system.

Further increasing the record pitch as the recording position moves toward the outer track resulted in the margin of the recording laser power being wider at the outer track portion than at the inner track portion. This means that the data recording with the record pit pitch being increased by about 10 % as mentioned above can provide the highest performance, and that further increasing the record pit pitch simply decreases the recording capacity and is therefore useless.

Referring now to the flowchart given in FIG. 9, the control operation of the above-described arrangement, mainly the operation involving the transfer clock, will be explained.

When an access request is generated from a host machine (not shown) and a signal to that effect is supplied to the controller 4, the present optical disk apparatus starts functioning. First, the CPU 24 in the controller 4 receives access information from the host machine (step ST1). This access information includes a track number and a sector number for specifying the position on the optical disk 1 to be accessed and a command for specifying an operation. The access information is stored in the memory 25 and will be referred to when needed in the following process. Then, the CPU 24 refers to the conversion table 26 (step ST2). More specifically, the CPU 24 extracts the track number from the access data stored in the memory 25 and sends it to the conversion table 26. The fetched track number is an address input of the ROM having the conversion table 26, and the table 26 outputs data associated with the track number. The CPU 24 sends the data read out from the conversion table 26 as the set data S13 to the variable frequency divider 61 (step ST3). As a result, the frequency divider 61 outputs the data transfer clock CK1 with a frequency according to the track number, and this clock is supplied to the buffer memory 51, correction code affixing circuit 52, interleave circuit 53, control signal affixing circuit 54 and data modulator 55.

Then, header information is read out (step ST4). In reading the header information, a coarse access is conducted first so that the optical head 5 is moved to the target track position by the moving mechanism (not shown). This target track position in the coarse accessing operation is determined by referring to the track number in the access information stored in the memory 25. The header information is reproduced at the track position on the optical disk 1, which the optical head 5 now faces after the coarse access. The track number included in the reproduced header information is compared with the track number of the target track position to check if the optical head 5 is on the target track. If the optical head 5 is off the target track, the tracking servo circuit (not shown) in the signal processor 17 is driven to slightly move the objective lens 9 of the optical head 5 in the direction normal to the optical axis to execute a fine access for directing the laser beam accurately on the target track. If the track number included in the reproduced header information coincides with that of the target track position to provide the track ON state by this fine access, data recording or reproducing becomes possible.

It is then determined whether or not the operation requested by the host machine is data reproduction (read) or data recording (write) by referring to the command in the access information stored in the memory 25 (step ST5). If the command specifies the data reproduction, the above-described reproducing operation is executed (step ST6). At this time, the reproduction clock CK2 to be supplied to the data demodulator 40, control signal decoding/eliminating circuit 41, deinterleave circuit 42 and error correcting circuit 43, which are hardware for the data reproducing system, is produced by separating the self clock from the reproduction data S7 by means of the data demodulator 40, as explained earlier.

If the command is found to specify data recording in step ST5, the above-described data recording is executed (step ST7). At this time, as described earlier, since the transfer clock CK1 output from the variable frequency divider 61 is supplied to the buffer memory 51, correction code affixing circuit 52, interleave circuit 53, control signal affixing circuit 54 and data modulator 55, which are hardware for the data recording system, record pits are formed by the transfer clock whose frequency is controlled in accordance with the track number. The record pit pitch gradually increases step by step, not linearly, as the recording position approaches the outer track of the optical disk 1.

As described above, according to the present recording system, the recording capacity per optical disk can be set greater than the one attained by the recording system employing the CAV system. Further, data recording is done in such a way that the linear density becomes lower (the recording pit pitch becomes larger) as the recording position moves outward. The recording condition can be significantly loosened without reducing the recording capacity so much as compared with the CLV system and constant linear density system. In other words, the present invention can provide an information recording apparatus which can ensure substantially the same recording capacity as obtained by the CLV system, can stably keep the recording laser power margin at both the inner and outer tracks to thereby further improve the reliability of recorded data by recording information in such a way that the record pit pitch is increased by about 10 % at the outer track position of a radius 2r.

According to the present recording system, in gradually widening the record pit pitch, the transfer clock specifying the recording timing is changed step by step so that a change in transfer clock per step is set to about 1 %, i.e., about 100 steps as a whole are provided for the transfer clock. This can reduce the amount of hardware necessary for generation of the transfer clock and can therefore simplify the arrangement in addition to the ability to accurately access to the target track.

Furthermore, since the number of rotations of an optical disk is kept constant, the accessing time can be set sufficiently high as compared with the recording system involving the CLV system.

What is claimed is:

1. An information recording apparatus comprising:
    rotating means for rotating an optical disk at a constant velocity;
    recording means for recording information with a light beam irradiated on said optical disk;
    detecting means for detecting a radial position on said optical disk where said recording means is positioned;
    transfer clock generating means for generating a transfer clock with a variable frequency which is changed step by step such that a ratio of change in the frequency is lower than that in a linear velocity of said optical disk relating to the said recording means, as said recording means moves from an innermost portion toward an outermost portion of said optical disk, the frequency being predetermined when said detecting means detects that said recording means is positioned on an innermost portion of said optical disk; and
    control means for controlling said recording means to form record pits in accordance with said transfer clock signal.

2. An information recording apparatus according to claim 1, wherein said detecting means has a CPU.

3. An information recording apparatus according to claim 1, wherein said transfer clock generating means includes:
    a conversion table for outputting data corresponding to a track number;
    clock generating means for generating a clock signal alternating at given periods;
    a variable frequency divider for subjecting said clock signal from said clock generating means to frequency division in accordance with said data read out from said conversion table to thereby produce a transfer clock with a frequency corresponding to said track number; and
    driving means for driving said recording means in accordance with said transfer clock from said variable frequency divider.

4. An information recording apparatus according to claim 3, wherein said conversion table stores data for increasing said frequency of said transfer clock from said variable frequency divider step by step as said track number changes from that of an inner track side of said optical disk to that of an outer track side, an amount of a change in frequency per step being smaller than an amount of a change in frequency in a decodable limit in a digital modulation system.

5. An information recording apparatus comprising:
    rotating means for rotating an optical disk at a constant angular velocity, the disk including one of a spiral recording rack and a concentric recording track;
    recording means for recording information with a light beam irradiated on the recording tracks of said optical disk; and
    control means for controlling said recording means such that the information is recorded on the optical disk while a pitch between adjacent record pits is elongated step by step, as said recording means moves from an innermost portion toward an outermost portion of the optical disk, in such a manner that a ratio of change in the pitch is lower than that in a linear velocity of the optical disk relating to said recording means;
    wherein said control means includes:
    a conversion table for outputting data corresponding to a track number at which said recording means is located,
    clock generating means for generating a clock signal alternating at a given period,
    a variable frequency divider for subjecting said clock signal to frequency division in accordance with said data output from said conversion table to thereby produce a transfer clock signal with a frequency corresponding to said track number so that the pitch between adjacent record pits is elongated step by step said recording means moves from the innermost portion toward the outermost portion of the optical disk, and
    driving means for driving said recording means in accordance with said transfer clock signal from said variable frequency divider.

6. An information recording apparatus according to claim 5, wherein said conversion table stores data for increasing said frequency of said transfer clock signal from said variable frequency divider as said track number changes from that of an inner track side of said optical disk to that of an outer track side, a rate for increasing said frequency falling within a range of $1 > k > 0.5$ with respect to a position with a radius r.

* * * * *